Aug. 31, 1926.
P. F. HACKETHAL
1,597,882
INTAKE MANIFOLD FOR INTERNAL COMBUSTION ENGINES
Filed Sept. 25, 1924
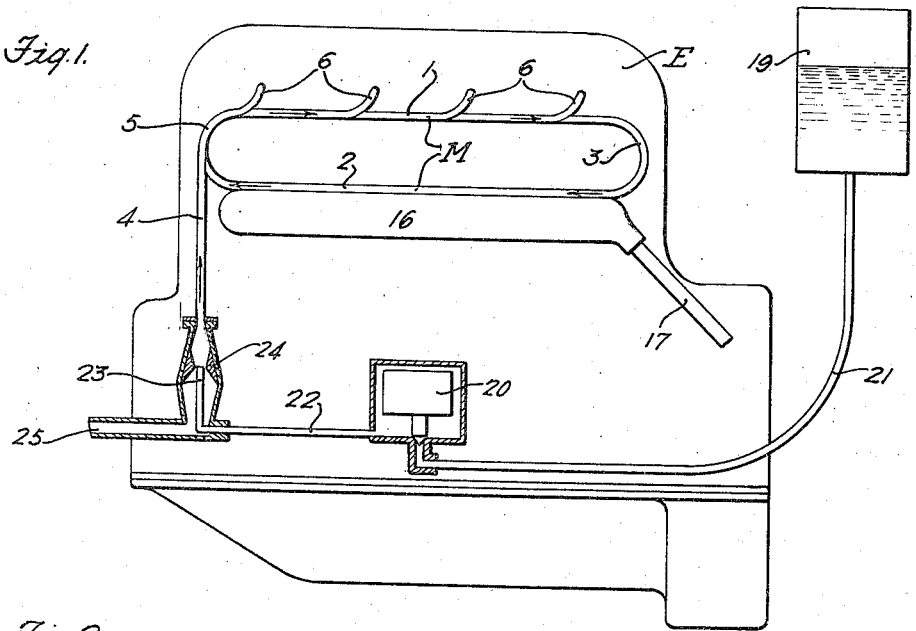
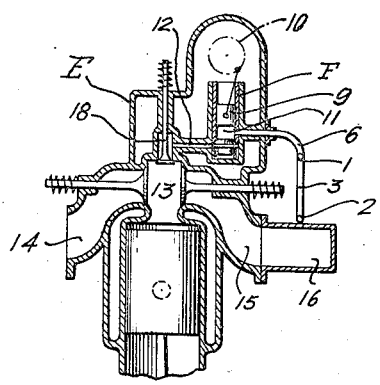
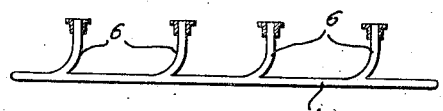
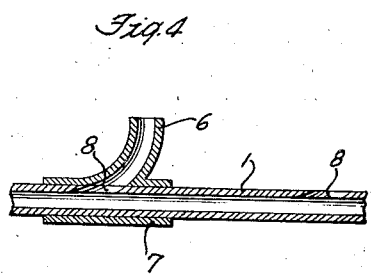
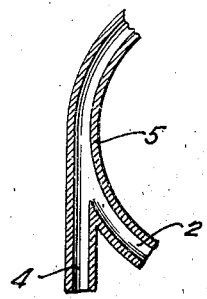
INVENTOR
Paul F. Hackethal
BY
Adolph A. Thomas
ATTORNEY Patented Aug. 31, 1926.

1,597,882

UNITED STATES PATENT OFFICE.

PAUL F. HACKETHAL, OF CLEVELAND, OHIO, ASSIGNOR TO MAEDLER ENGINE CORPORATION, OF BALTIMORE, MARYLAND, A CORPORATION OF MARYLAND.

INTAKE MANIFOLD FOR INTERNAL-COMBUSTION ENGINES.

Application filed September 25, 1924. Serial No. 739,765.

My invention relates to internal combustion engines adapted to run on heavy fuel, and its object is to provide an intake manifold through which a mixture of fuel and a gaseous medium circulates in such a way that heavy particles of fuel are automatically prevented from entering a fuel-preparing device used to prepare the fuel charge for injection into the air charge in the working cylinder. The construction and operation of this new manifold are such that, during the flow of the fuel mixture through the manifold, the finely atomized particles of fuel are drawn into the fuel-preparing device, whereas the heavy particles are automatically circulated through the manifold and treated in such a manner that they are reduced to a fine spray, ready for treatment in the fuel-preparing device.

More specifically considered, the manifold of my invention comprises a circulating pipe of small bore, into which a mixture of fuel and a gaseous medium is drawn at high velocity by the vacuum created in pumps used to prepare the fuel charge for the engine, as will be explained in detail. One section of the manifold pipe is provided with branch connections to the fuel pumps, and the return section is arranged so that it can be heated by the exhaust gases or in any other practical way. In the operation of the manifold, the finely divided particles of fuel, as they flow at high speed through the manifold pipe, are sucked through the branch connections into the fuel pumps. However, the heavier particles of fuel, owing to their tremendously high velocity, are carried by their own momentum past the branch outlets in the main section of the manifold pipe and continue their travel through the heated return section of the manifold, and from there back into the feeding section of the pipe. If these heavy particles of fuel have not been sufficiently atomized during their first passage through the return manifold pipe, they automatically circulate again through the manifold until the required degree of atomization is accomplished. It should be noted that the fuel mixture circulates through the manifold in one direction only, which causes the fuel mixture to flow at a practically constant high velocity.

In the accompanying drawings, which illustrate a practical embodiment of my invention:—

Fig. 1 is a side view, largely diagrammatic, of a multi-cylinder internal combustion engine equipped with a manifold constructed in accordance with my invention;

Fig. 2 is a transverse cross-section through the engine showing the connections between the manifold and one of the engine cylinders;

Fig. 3 is a sectional plan view of the feeding section of the manifold in detached position;

Fig. 4 is an enlarged fragmentary view in cross-section showing a convenient way of connecting the fuel outlet branches of the manifold with the main section of the pipe; and Fig. 5 is an enlarged fragmentary view showing the junction of the return section of the manifold with the fuel inlet branch.

The intake manifold of my invention comprises a pipe indicated as a whole by M. This pipe consists of a main or feeding section 1 and a return section 2, which together form a looped pipe. That is to say, a pipe which is closed upon itself. The sections 1 and 2 of the manifold are joined at the rear end by a properly curved cross-connection 3. Pipe M is provided with a fuel inlet branch 4 through which a mixture of fuel and gaseous medium is admitted into the main or feeding section 1 of the manifold. The return section 2 of pipe M leads back to the inlet end of the manifold at the point 5, as best shown in Fig. 5. The curvature of pipe 2 at this junction point is such that any gases passing through pipe 2 are drawn into the inlet portion of the manifold and mix readily with the gaseous mixture entering the manifold through the inlet pipe 4.

The main or feeding section 1 of the manifold is provided with a plurality of branch outlets 6. I have shown four of these outlets in the drawings, merely because it has been assumed that the internal combustion engine E is a four-cylinder engine. It will be understood that the number of branch outlets 6 depends upon the particular design and construction of the engine. It is not necessary that there be an outlet for each cylinder, for it is obvious that one outlet may supply fuel to more than one cylinder. The outlet branches 6 may conveniently be formed as a casting provided with a sleeve portion 7 constructed to fit over the pipe 1 and to be secured rigidly thereon, as shown in Fig. 4. The pipe 1 is provided with openings 8 which register with the outlet branches 6. As seen in Figs. 1 and 3, the outlet pipes 6 are curved at an angle to the pipe 1. This angle of curvature is in the direction in which the gaseous mixture flows or circulates through the manifold pipe. The purpose of this arrangement of the outlet pipes 6 will become clear later on.

In the particular instance illustrated in the drawings, it has been assumed that each of the fuel outlet pipes 6 is connected with a fuel pump indicated as a whole by F. I need not go into the structural details of pump F, since that does not, in and of itself, form part of my present invention. It is sufficient to say that the fuel pump has a piston 9 operated by any suitable connection diagrammatically indicated at 10. The interior of pump chamber 11 is connected through a pipe 12 with the combustion chamber 13 of the working cylinder. An air charge is admitted into the working cylinder through a valve-controlled pipe 14, and the combustion gases pass out of a valve-controlled pipe 15 into the exhaust manifold 16 which is connected with an exhaust pipe 17. In reference to the operation of fuel pump F, I need only say here that the outward movement of pump piston 9 produces a predetermined vacuum in the pump chamber 11, and the moment when the piston 9 uncovers the connection with branch pipe 8, a fixed volume of a mixture of fuel and a gaseous medium is drawn into the pump chamber. This mixture is compressed upon the inward stroke of the pump piston and at the proper moment this highly compressed mixture is injected into the combustion chamber 13 through the properly timed valve 18. The vacuum created in the pump chamber is practically constant and is independent of engine speed or load, and the compressed fuel charge is injected into the air charge in the working cylinder at a practically constant velocity independent of engine speed. I make no claim to a fuel pump of this kind, nor to this method of preparing and injecting a fuel charge, because such method and apparatus form the subject matter of a co-pending application of Franz Maedler, Serial Number 556,746, filed April 26, 1922, to which reference may be had for further details. It will be understood that in the broader aspect of my invention, any other practical mechanism may be used for causing a proper fuel mixture to enter the inlet pipe 4 of the manifold and to inject the same into the air charge in the working cylinders of the engine.

The inlet pipe 4 is connected with a suitable source of fuel supply so constructed that a mixture of the fuel and a gaseous medium may be drawn into pipe 4 and fed into the working cylinders through outlet branches 6. In the particular construction shown in the drawings, there is a tank 19 containing fuel at or above atmospheric pressure. A float chamber 20 is connected with the fuel tank 19 through a feed pipe 21, and from float chamber 20 extends a pipe 22 which terminates in a fuel nozzle or jet 23. The nozzle 23 is arranged in a Venturi tube 24 which connects with a pipe 25. This pipe may be open to atmospheric air, or air under pressure, or combustion gases from a working cylinder, or to any other gaseous medium suitable to draw fuel out of nozzle 23 and carry the same into the fuel pumps for compression, preparation and injection.

The operation of the manifold above described is as follows: As the pistons 9 in the fuel pump F move outwardly, they create a predetermined vacuum in each pump cylinder consecutively. The effect of these vacua is to draw a gaseous medium through pipe 25, past the fuel jets 23, through Venturi tube 24, and thence through inlet pipe 4 into the main section 1 of the manifold. The flow of this mixture through the manifold is at a predetermined high velocity, which may be as great as 1500 feet or more per second, and is preferably not less than 750 feet per second. The suction of the vacuum being constant at all engine speeds and loads, the velocity of the fuel mixture through the manifold remains practically constant. As the fuel mixture passes through pipe 1, the lighter particles of fuel mixture are sucked through the branch pipe 6 into the fuel pumps, where the mixture is prepared for injection into the air charge in the working cylinder, as previously explained. Owing to the high velocity of the fuel mixture through pipe 1, the heavier particles of fuel, which have not been sufficiently broken up in leaving the jet 23, are by their own momentum carried through the straight pipe 1 into the heated return pipe 2. As the heavy particles of fuel strike the return bend 3, they are thrown against the walls of the pipe with considerable impact, which, as I believe, causes the particles to spread out and thereby receive the maximum amount of heat in passing through the heated return pipe 2. Consequently, when the fuel mixture in pipe 2 reaches the point 5, it is in a condition to be drawn into the fuel pumps.

The foregoing operation of the manifold automatically repeats itself. Attention is called to the fact that, owing to the tremendously high velocity of the fuel mixture and to the fact that there is no change of direction in the flow of the fuel mixture through the manifold, it is not necessary to have the fuel supply device at equal distance from each of the fuel pump inlet ports.

The diameter of the bore of the manifold pipe should preferably be such that the total volumetric capacity of the manifold is not greater than twice the capacity of each fuel pump. This gives us the necessary high velocity of the fuel mixture through the manifold, and at the same time allows of instantaneous changes of fuel mixture to take care of changes in engine speed and load. Although it is beneficial to keep the total volumetric capacity of the manifold down to the smallest practical limit, it should be understood that in engines not subject to sudden changes of speed and load the capacity of the manifold may be increased, provided only that a practical high velocity of the fuel mixture through the manifold is maintained.

The heating of the return pipe 2 may be accomplished in any practical way. Perhaps the most convenient method is to utilize the heat of the exhaust gases and for this purpose I have shown the manifold so mounted that the return section 2 of the pipe rests on, passes through, or is in contact with, the exhaust manifold 16. I want it understood that this arrangement of the manifold is merely a matter of preference and is not essential in the broader aspect of my invention.

Although I have herein shown and described a certain specific construction, I want it understood that this is merely by way of illustration, for it is obvious that the fundamental idea of my invention may be mechanically embodied in other ways than herein set forth.

What I claim as my invention is:—

1. In multi-cylinder internal combustion engines provided with fuel-preparing pumps adapted to create a predetermined vacuum on one stroke and a compression on the other stroke, an intake manifold for supplying a mixture of gaseous medium and sprayed fuel to said pumps, said manifold comprising a circulating pipe of small bore having an inlet and a plurality of outlets, means for heating a portion of said pipe, connections between said outlets and the fuel-preparing pumps, and means for passing a mixture of fuel and gaseous medium at high velocity through said pipe, the bore of said pipe being of such cross-sectional area that the velocity of said mixture through the pipe is never lower than 650 feet per second, said outlets being so arranged that vaporized portions of the fuel-mixture are drawn therethrough into the fuel pumps at a practically constant velocity independent of engine speed and load, while heavy particles of fuel are by their momentum carried past said outlets through the heated portions of said pipe until they become vaporized, whereupon they are drawn through said outlets into the fuel pumps.

2. In multi-cylinder internal combustion engines provided with fuel-preparing pumps adapted to create a predetermined vacuum on one stroke and a compression on the other stroke, an intake manifold comprising a looped pipe of small bore having a fuel-mixture inlet and a plurality of outlets for supplying fuel mixture to the fuel-preparing pumps at a practically constant velocity independent of engine speed and load, said manifold being characterized by the fact that the fuel mixture circulates therethrough always in the same direction at high velocity at all engine speeds, the bore of said pipe being of such cross-sectional area that the velocity of said mixture through the pipe is never lower than 650 feet per second, means for automatically preventing non-vaporized particles of fuel from entering said outlets and causing them to circulate through said pipe, and means for breaking down and vaporizing these particles as they circulate through the manifold, whereupon they are drawn through said outlets into the fuel-preparing pumps.

3. In multi-cylinder internal combustion engines, an intake manifold comprising a looped pipe of small bore having a main section and a return section, said main section having an inlet and a plurality of outlets, a fuel-preparing pump connected with each outlet, the total volumetric capacity of said pipe being not greater than twice the volumetric capacity of each pump, means for producing a predetermined constant vacuum in each pump on one stroke and a compression on the other stroke, the vacuum in said pumps causing a mixture of fuel and gaseous medium to flow through said pipe at high velocity at all engine speeds, said outlets being so connected to said pipe that only vaporized fuel-mixture is drawn through these branches as the mixture circulates through the manifold pipe, while heavy particles of fuel are automatically circulated through the manifold until they become vaporized, and means for heating a section of said pipe to break down and vaporize the particles of liquid fuel passing therethrough.

PAUL F. HACKETHAL.